US012437651B2

(12) United States Patent
Cho

(10) Patent No.: US 12,437,651 B2
(45) Date of Patent: Oct. 7, 2025

(54) METHOD AND APPARATUS FOR CONTROLLING PLATOONING

(71) Applicant: HYUNDAI MOBIS CO., LTD., Seoul (KR)

(72) Inventor: Chang Ho Cho, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 218 days.

(21) Appl. No.: 18/217,835

(22) Filed: Jul. 3, 2023

(65) Prior Publication Data

US 2024/0013661 A1 Jan. 11, 2024

(30) Foreign Application Priority Data

Jul. 6, 2022 (KR) ........................ 10-2022-0083277

(51) Int. Cl.

| | |
|---|---|
| ***G08G 1/096*** | (2006.01) |
| ***G08G 1/00*** | (2006.01) |
| ***G08G 1/0967*** | (2006.01) |
| *G07B 15/06* | (2011.01) |

(52) U.S. Cl.

CPC ......... *G08G 1/22* (2013.01); *G08G 1/096783* (2013.01); *G08G 1/096791* (2013.01)

(58) Field of Classification Search

CPC .... G08G 1/22; G08G 1/167; G08G 1/096783; G07B 15/063

See application file for complete search history.

(56) References Cited

U.S. PATENT DOCUMENTS

| | | | | |
|---|---|---|---|---|
| 2014/0107867 | A1* | 4/2014 | Yamashiro | B60W 10/18 701/2 |
| 2014/0316671 | A1* | 10/2014 | Okamoto | G08G 1/22 701/96 |
| 2019/0311616 | A1* | 10/2019 | Jin | G05D 1/0297 |
| 2019/0353493 | A1 | 11/2019 | Takahashi et al. | |
| 2021/0122374 | A1* | 4/2021 | Da Silva | G06V 20/588 |
| 2022/0058955 | A1 | 2/2022 | Park | |
| 2022/0237583 | A1 | 7/2022 | Bandi et al. | |

FOREIGN PATENT DOCUMENTS

CN 109285373 A 1/2019

OTHER PUBLICATIONS

Extended European Search Report issued in corresponding European Application No. 23182407.9 dated Dec. 7, 2023.

* cited by examiner

*Primary Examiner* — Tan Q Nguyen

(74) *Attorney, Agent, or Firm* — Morgan Lewis & Bockius LLP

(57) ABSTRACT

Provided is a method for a leading vehicle for controlling platoon separation in platooning and lane change of a platoon. The method includes performing platooning in a platoon, separating an existing platoon into a plurality of platoons according to a request or need for platoon separation, determining whether it is possible to change a lane of the separated platoon to which the leading vehicle belongs, transmitting lane change information to a platoon vehicle within the separated platoons upon determination that lane change is possible, and changing a driving lane for lane change of the separated platoon.

7 Claims, 8 Drawing Sheets

METHOD AND APPARATUS FOR CONTROLLING PLATOONING

CROSS REFERENCE TO RELATED APPLICATIONS

This application claims the benefit of earlier filing date and right of priority to Korean Application No. 10-2022-0083277, filed on Jul. 6, 2022, the contents of which are hereby incorporated by reference herein in their entirety.

BACKGROUND OF THE DISCLOSURE

Field of the Disclosure

The present disclosure relates to a method and apparatus for controlling platooning, and more particularly to a method and apparatus for controlling platoons performing platooning, driving while maintaining the separated platoons, or platoon change of the platoons, and a method and apparatus for allocating tollgates through platoon separation or lane change.

Discussion of the Related Art

The contents described below merely provide background information related to the present embodiment and do not constitute prior art.

In general, platooning means that a plurality of vehicles grouped together share driving information with each other and travel on a road while considering external environments. One platoon includes a leading vehicle and a follower vehicle. The leading vehicle is a vehicle leading the platoon at the front of the platoon, and the follower vehicle is a vehicle following the leading vehicle.

The follower vehicle of the platoon may maintain following of the leading vehicle by using driving information of the leading vehicle transmitted through a vehicle-to-vehicle communication method or the like. Accordingly, a driver of the follower vehicle is capable of freely performing actions other than driving indoors. By this platooning, convenience of the driver may be increased and transportation efficiency may be increased.

In a process of platooning, when a platooning vehicle needs to pass through a tollgate, it is necessary to allocate a tollgate for each vehicle type to pass through to ensure smooth platooning.

SUMMARY OF THE DISCLOSURE

The present disclosure enables platoon separation in platooning, platooning while maintaining a separate platoon, and lane change in platooning.

Traffic may be smoothed by allocating a tollgate to each vehicle according to a vehicle type.

According to an embodiment, a toll booth, a lead vehicle, and a platoon vehicle may share information with each other.

According to an embodiment, each vehicle may be assigned a tollgate and form a new platoon.

According to an embodiment, each vehicle may form a new platoon after passing through a tollgate.

In addition, according to an embodiment, lane change may be performed after forming a new platoon.

It will be appreciated by persons skilled in the art that the objects that could be achieved with the present disclosure are not limited to what has been particularly described hereinabove and the above and other objects that the present disclosure could achieve will be more clearly understood from the following detailed description.

According to the present disclosure, a method for a leading vehicle for controlling platoon separation in platooning and lane change of a platoon includes performing platooning in a platoon, separating an existing platoon into a plurality of platoons according to a request or need for platoon separation, determining whether it is possible to change a lane of the separated platoon to which the leading vehicle belongs, transmitting lane change information to a platoon vehicle within the separated platoons upon determination that lane change is possible, and changing a driving lane for lane change of the separated platoon.

According to the present disclosure, an apparatus for a leading vehicle for controlling platoon separation in platooning and lane change of a platoon includes a transceiver configured to transmit and receive information to and from platoon vehicles in the platoon, a controller configured to control driving related to the platooning, control platoon separation, and control lane change, and a user interface configured to provide a user interface to a driver, wherein the controller controls the leading vehicle to perform platooning in a platoon, separate an existing platoon into a plurality of platoons according to a request or need for platoon separation, determine whether it is possible to change a lane of the separated platoon to which the leading vehicle belongs, transmit lane change information to a vehicle in the separated platoons upon determination that lane change is possible, and change a driving lane for lane change of the separated platoon.

According to the present disclosure, a vehicle for controlling platoon separation in platooning and lane change of a platoon includes a transceiver configured to transmit and receive information to and from platoon vehicles in the platoon, a controller configured to control driving related to the platooning, control platoon separation, and control lane change, and a user interface configured to provide a user interface to a driver, wherein the controller controls the vehicle to perform platooning in a platoon, separate an existing platoon into a plurality of platoons according to a request or need for platoon separation, determine whether it is possible to change a lane of the separated platoon to which the leading vehicle belongs, transmit lane change information to a vehicle in the separated platoons upon determination that lane change is possible, and change a driving lane for lane change of the separated platoon.

DETAILED DESCRIPTION OF THE DISCLOSURE

Figure 1:
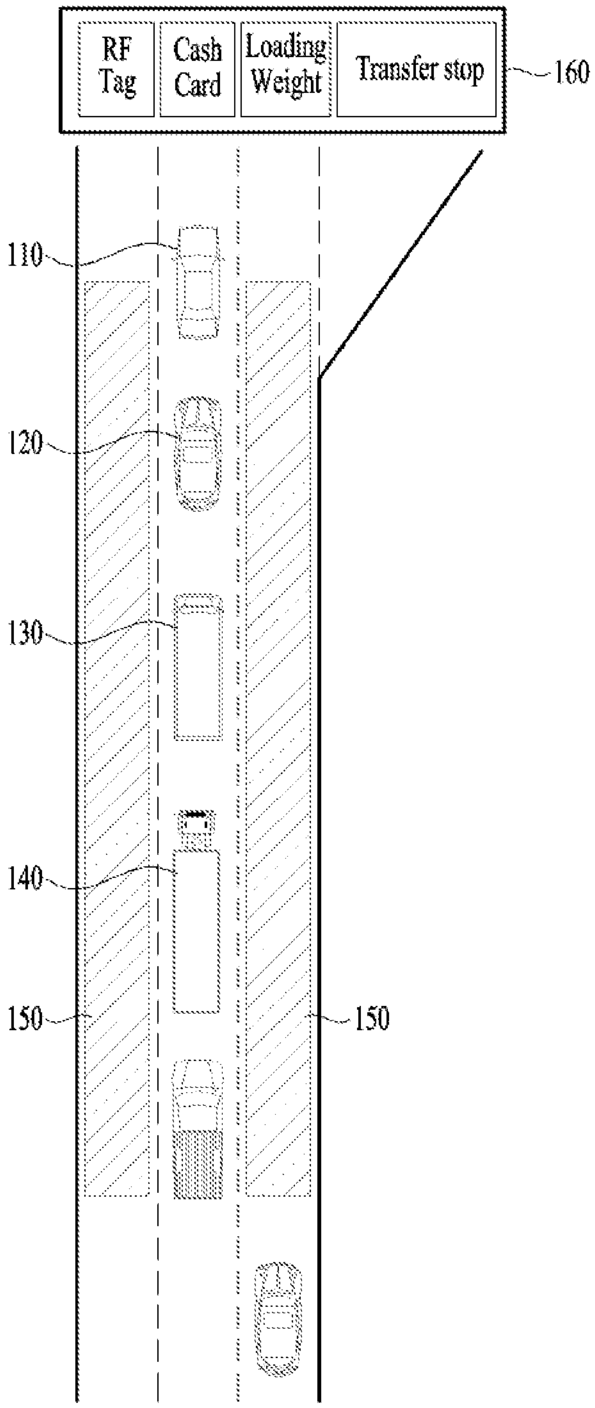
FIG. 1 is a diagram for explaining a process in which platooning vehicles pass through a toll booth according to an embodiment of the present disclosure.

Hereinafter, some embodiments of the present disclosure will be described in detail with reference to the accompanying drawings. In the following description, like reference numerals designate like elements although the elements are shown in different drawings. Further, in the following description of the at least one embodiment, a detailed description of known functions and configurations incorporated herein will be omitted for the purpose of clarity and for brevity.

It will be understood that, although the terms first, second, i), ii), a), and b) may be used herein to describe various elements of the present disclosure, these terms are only used to distinguish one element from another element and essential, order, or sequence of corresponding elements are not limited by these terms. In addition, when a certain part "includes" or "has" a certain component, this indicates that the part may further include another component instead of excluding another component unless there is no different disclosure.

The detailed description, which will be given below with reference to the accompanying drawings, is intended to explain exemplary embodiments of the present disclosure, rather than to show the only embodiments that may be implemented according to the present disclosure.

FIG. 1 is a diagram for explaining a process in which platooning vehicles pass through a toll booth according to an embodiment of the present disclosure. Platooning vehicles may move in one row. Platooning vehicles may move in multiple rows instead of just one. Among the platooning vehicles moving in one row, a vehicle in front is a leading vehicle. Vehicles behind the leading vehicle are platoon vehicles. Each vehicle may include a controller, a transmitter, and a receiver. The platooning vehicles may include a general vehicle, a truck, a bus, etc. A toll booth may include gates that pay a fee for each vehicle type. A gate for paying a fee may have the same meaning as a tollgate. A leading vehicle, a platoon vehicle, and a toll booth may share information using a transmitter and a receiver.

Referring to FIG. 1, a leading vehicle 110 may correspond to a frontmost vehicle among platooning vehicles in a row. The leading vehicle 110 may include a controller, a transmitter and a receiver. Platoon vehicles may include a general vehicle 120, a bus 130, and a truck 140. The general vehicle 120, the bus 130, and the truck 140 may include a controller, a transmitter, and a receiver. The leading vehicle 110 may receive platoon vehicle information from the general vehicle 120, the bus 130, and the truck 140. The platoon vehicle information may include vehicle type and location information, surrounding vehicle information, and the like. The general vehicle 120 may be equipped with a radio frequency (RF) payment device. The bus 130 may stop at a transfer stop. The truck 140 may be carrying a load of cargo. A toll booth 160 may include a transmitter, a receiver, an RF tag gate, a cash or card payment gate, a load weight gate, and a transfer stop gate. The toll booth 160 may transmit information on a toll booth to the leading vehicle 110. The information on the toll booth may include tollgate queue information, tollgate information, tollgate operation information, remaining distance information, and information on an estimated time of arrival.

The leading vehicle 110 may generate gate assignment information using platoon vehicle information received from the general vehicle 120, the bus 130, and the truck 140, and toll booth information received from the toll booth 160. The leading vehicle 110 may transmit the gate assignment information to the general vehicle 120, the bus 130, and the truck 140. The gate assignment information may include tollgate information through which the general vehicle 120, the bus 130, and the truck 140 pass. Accordingly, it is possible to move to tollgates that have a short queue of the general vehicle 120, the bus 130, and the truck 140 and match a type of vehicle.

When a time for the leading vehicle 110 to pass through an assigned tollgate is later than a time for passing through a tollgate to which the following platoon vehicle is assigned, a new leading vehicle may be selected. Platoon vehicles may be assigned a tollgate and may leave a lane to move to another lane 150 to move to the corresponding tollgate. When the platoon vehicles move to the other lane 150, the platoon vehicles may transmit departure time information to the leading vehicle 110. Sensors may be present in the platoon vehicles and the other lane 150. The departure time information may be calculated through the sensors present in the platoon vehicles and the sensors present in the other lane 150. The platoon vehicles may form new platoons before passing the toll booth 160. The platoon vehicles may form new platoons after passing the toll booth 160.

Figure 2:
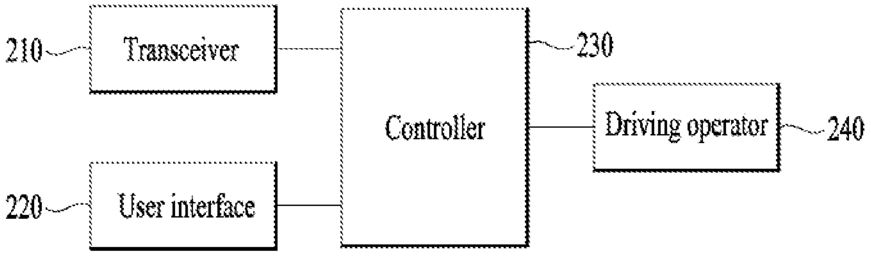
FIG. 2 is a block diagram of a vehicle control device mounted on a platooning vehicle according to an embodiment of the present disclosure.

FIG. 2 is a block diagram of a vehicle control device mounted on a platooning vehicle according to an embodiment of the present disclosure.

Referring to FIG. 2, each platooning vehicle may include a transceiver 210, a user interface 220, a controller 230, and a driving module 240. The transceiver 210 may transmit and receive information through a communication network between platooning vehicles or between a platooning vehicle and a toll booth. The transceiver 210 may transmit and receive information between platooning vehicles or between a platooning vehicle and a toll booth through at least one of wireless LAN (LAN), Wireless-Fidelity (Wi-Fi), Wireless Fidelity (Wi-Fi) Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), or Long Term Evolution-Advanced (LTE-A).

The transceiver 210 may perform short-range communication between platooning vehicles. Since platooning vehicles drive while maintaining a short distance from each other, the transceiver 210 may transmit and receive information between platooning vehicles through short-range wireless communication. In this case, the transceiver 210 may transmit and receive various types of information between platooning vehicles through Bluetooth, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, Wireless Universal Serial Bus (Wireless USB), etc. The transceiver 210 may include a transmitter and a receiver.

The user interface 220 may provide a user interface to a driver. The user interface 220 may receive information from the driver and input the information to the controller 230, or output a result of an operation. For example, the driver may input assigned tollgate information to the user interface 220. The user interface 220 may input tollgate information to the controller 230. The controller 230 may issue a control command to the driving module 240 using tollgate information. The user interface 220 may output a route to the assigned tollgate and the like. The driving module 240 may drive the vehicle based on manipulation of the driver or an autonomous driving function.

The controller 230 may control the driving module 240 to drive the vehicle according to gate assignment information received from the transceiver 210 and user input information received from the user interface 220. The controller 230 may include a control device. The controller 230 may transmit gate assignment information to the transceiver 210 using platoon vehicle information and toll booth information received from the transceiver 210. The gate assignment information of the transceiver 210 may be transmitted to the platoon vehicle.

Figure 3:
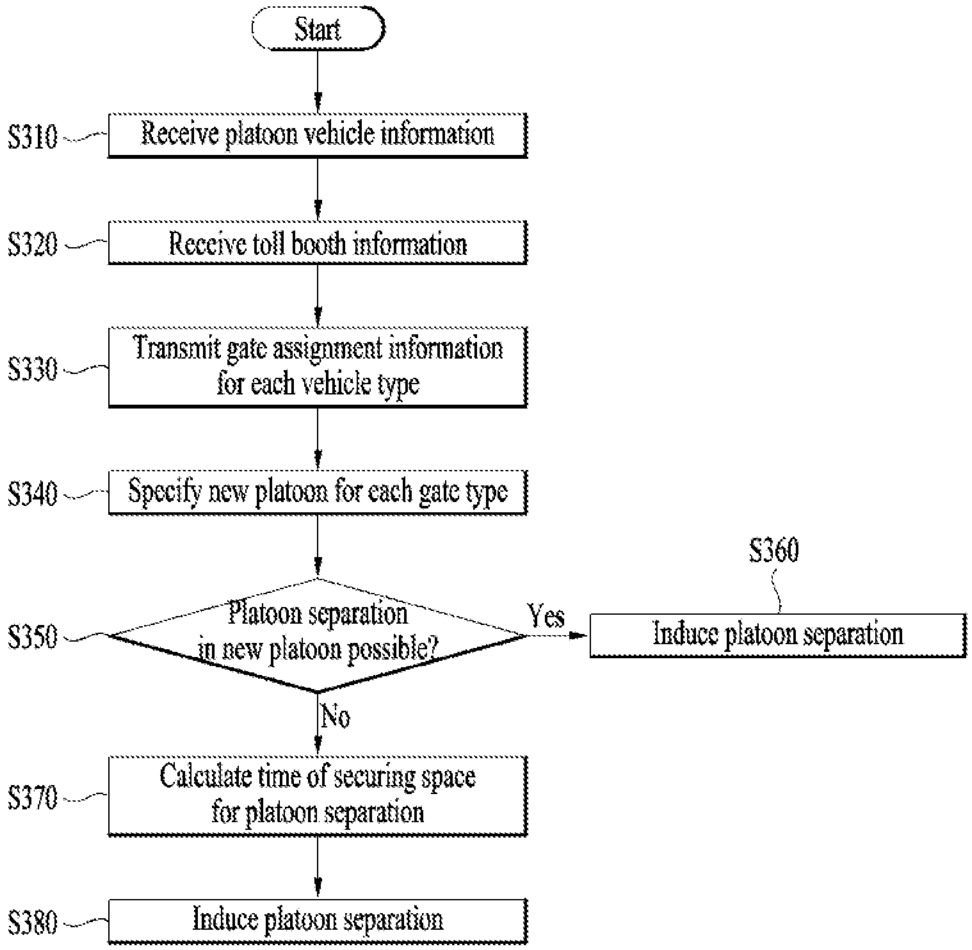
FIG. 3 is a diagram for explaining a process of inducing a leading vehicle to allocate a tollgate to each vehicle and form a new platoon according to an embodiment of the present disclosure.

FIG. 3 is a diagram for explaining a process of inducing a leading vehicle to allocate a tollgate to each vehicle and form a new platoon according to an embodiment of the present disclosure.

Referring to FIG. 3, a leading vehicle may receive platoon vehicle information from a following platoon vehicle using a receiver (S310). The leading vehicle may receive toll booth information from a toll booth using the receiver (S320). The leading vehicle may generate gate assignment information using the platoon vehicle information and the toll booth information using a controller and transmit the gate assignment information to the following platoon vehicle using a transmitter (S330). The leading vehicle may specify a new platoon for each gate type using the controller (S340). The controller may specify a new platoon for each gate type using the toll booth information.

The leading vehicle may determine whether platoon separation of vehicles in a new platoon is possible using the controller (S350). The controller may determine whether platoon separation in the new platoon is possible using the toll booth information. Whether platoon separation is possible may be determined based on whether lane change is possible. If lane change is possible, platoon separation is possible, and if lane change is not possible, platoon separation is not possible. If platoon separation is possible (S350—YES), the leading vehicle may generate platoon separation information using the controller and transmit the platoon separation information to the vehicles using a transmitter to induce platoon separation of the vehicles (S360). If platoon separation is not possible (S350—NO), the leading vehicle may calculate a time to secure a space for platoon separation using the controller (S370). The leading vehicle may induce platoon separation of the vehicles by generating the platoon separation information using the controller at the time of securing a space for platoon separation and transmitting the platoon separation information to the vehicles using a transmitter (S380).

Figure 4:
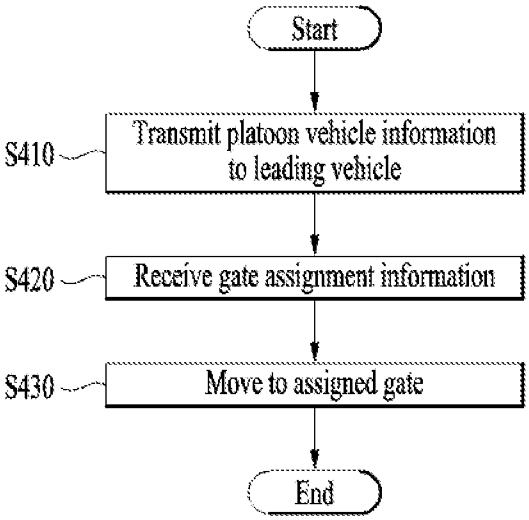
FIG. 4 is a diagram for explaining a process in which a platoon vehicle is assigned a tollgate and moves according to an embodiment of the present disclosure.

FIG. 4 is a diagram for explaining a process in which a platoon vehicle is assigned a tollgate and moves according to an embodiment of the present disclosure.

Referring to FIG. 4, a platoon vehicle may transmit platoon vehicle information to a leading vehicle using a transmitter (S410). The platoon vehicle may receive gate assignment information from the leading vehicle (S420). The platoon vehicle may move to a tollgate assigned using gate assignment information (S430). The platoon vehicle may move to the assigned tollgate and form a new platoon. As the new platoon is formed, the vehicles may smoothly pass through the tollgate.

Figure 5:
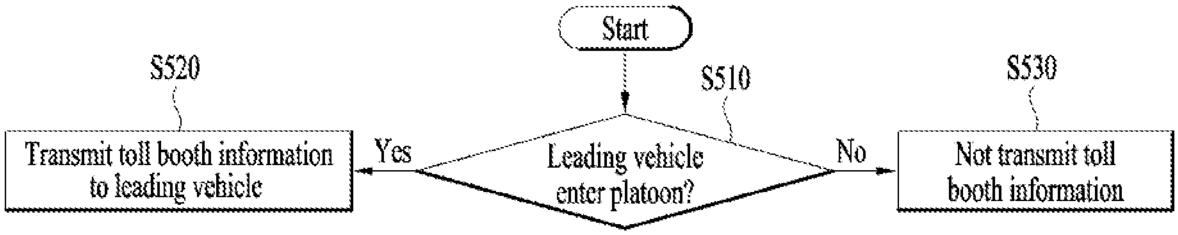
FIG. 5 is a diagram for explaining a process in which a toll booth transmits toll booth information to a leading vehicle according to an embodiment of the present disclosure.

FIG. 5 is a diagram for explaining a process in which a toll booth transmits toll booth information to a leading vehicle according to an embodiment of the present disclosure.

Referring to FIG. 5, the toll booth may determine whether or not the leading vehicle enters a platoon (S510). When the leading vehicle enters the platoon (S510—YES), the toll booth may transmit toll booth information to the leading vehicle using a transmitter (S520). If the leading vehicle does not enter the platoon (S510—NO), the toll booth may not transmit toll booth information (S530).

Figure 6:
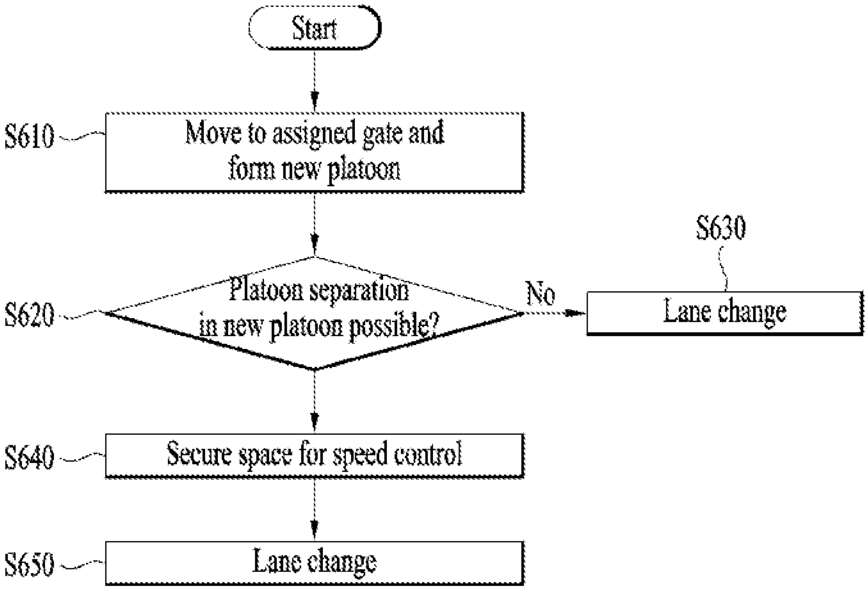
FIG. 6 is a diagram for explaining a process in which a leading vehicle of a new platoon passes through a tollgate according to an embodiment of the present disclosure.

FIG. 6 is a diagram for explaining a process in which a leading vehicle of a new platoon passes through a tollgate according to an embodiment of the present disclosure.

Referring to FIG. 6, platooning vehicles may move to an assigned tollgate and form a new platoon (S610). A vehicle at the front of the new platoon may correspond to a leading vehicle of the new platoon. The leading vehicle of the new platoon may determine whether platoon separation is possible (S620). Whether platoon separation is possible may be determined based on whether lane change is possible. If lane change is possible, platoon separation is possible, and if lane change is not possible, platoon separation is not possible. When platoon separation in the new platoon is possible (S620—YES), the leading vehicle of the new platoon may change lanes (S630). If platoon separation in the new platoon is not possible (S620—NO), the leading vehicle of the new platoon may secure a space through speed control (S640). The leading vehicle of the new platoon may change lanes by securing the space (S650). The leading vehicle of the new platoon may pass through a tollgate by changing lanes. Accordingly, traffic may be smoothed. Vehicles that have passed the tollgate may form a new platoon again.

Figure 7:
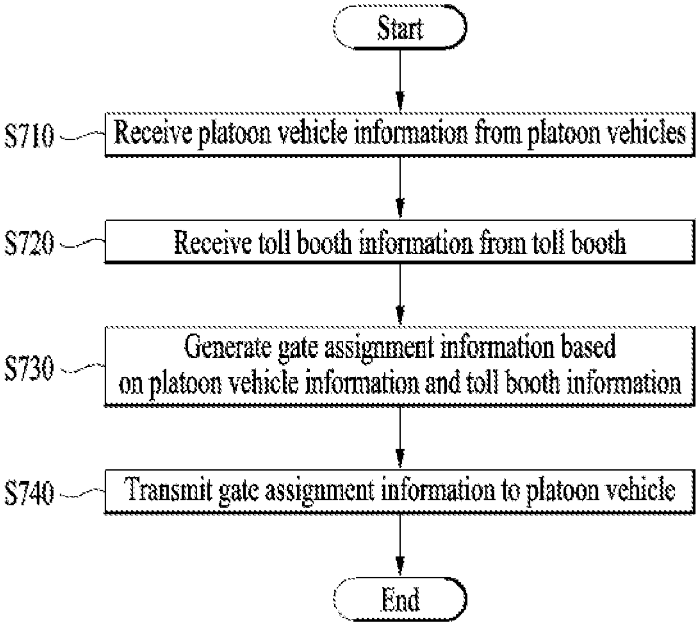
FIG. 7 is a diagram for explaining a method of allocating a tollgate to each vehicle depending on a vehicle type according to an embodiment of the present disclosure.

FIG. 7 is a diagram for explaining a method of allocating a tollgate to each vehicle according to a vehicle type according to an embodiment of the present disclosure.

Referring to FIG. 7, a transceiver of a leading vehicle may receive platoon vehicle information from platoon vehicles (S710). The platoon vehicle information may include at least one of vehicle type information, vehicle position information, or surrounding vehicle information. The transceiver of the leading vehicle may receive toll booth information from a toll booth (S720). The toll booth information may include at least one of tollgate queue information, tollgate information, tollgate operation information, remaining distance information, or information on an estimated time of arrival. A controller of the leading vehicle may generate gate assignment information based on the platoon vehicle information and the toll booth information (S730). The gate assignment information may include information on a tollgate through which a platoon vehicle passes. The transceiver of the leading vehicle may transmit the gate assignment information to the platoon vehicle (S740).

The controller of the leading vehicle may determine whether platoon separation of the platoon vehicle in a new platoon is possible based on the toll booth information. Here, the new platoon may be formed by moving platoon vehicles to a tollgate based on the gate assignment information. The controller of the leading vehicle may generate platoon separation information based on that platoon separation of the platoon vehicle in the new platoon is possible. The transceiver of the leading vehicle may transmit the platoon separation information to the platoon vehicle.

The controller of the leading vehicle may calculate a time of securing a space for platoon separation based on that platoon separation of the platoon vehicle in the new platoon is not possible and generate the platoon separation information based on the time of securing the space for platoon separation. The transceiver of the leading vehicle may transmit the platoon separation information to the platoon vehicle.

Figure 8:
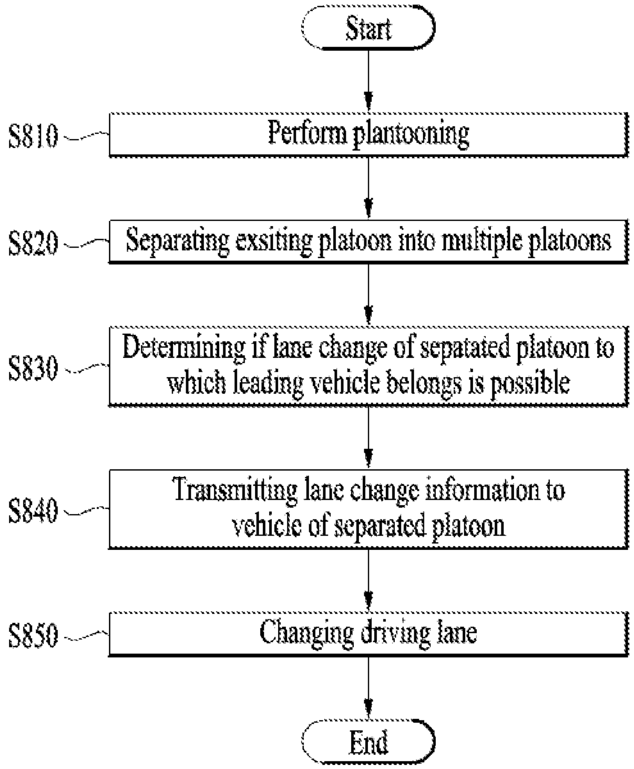
FIG. 8 is a diagram for explaining a method of controlling platoon separation in platooning and lane change.

FIG. 8 is a diagram for explaining a method of controlling platoon separation in platooning and lane change.

Referring to FIG. 8, of a leading vehicle of a platoon may perform platooning in the platoon (S810). The leading vehicle may control separation of the platoon into a plurality of platoons according to a request or need for platoon separation (S820). The leading vehicle may determine whether it is possible to change a lane of the separated platoon to which the leading vehicle belongs (S830). The leading vehicle may transmit lane change information to at least one platoon vehicle within the separated platoon upon determination that lane change is possible (S840). The leading vehicle may control change of a driving lane of the separated platoon (S850).

Additionally or alternatively, the leading vehicle may receive platoon vehicle information from the at least one platoon vehicle for the platoon separation. The platoon vehicle information may include at least one of vehicle type information, vehicle position information, or surrounding vehicle information Also, the leading vehicle may receive toll booth information from a toll booth. The toll booth information may include at least one of tollgate queue information, tollgate information, tollgate operation information, remaining distance information, or information on an estimated time of arrival.

The leading vehicle may generate gate assignment information based on the platoon vehicle information and the toll booth information. Then, the leading vehicle may transmit the gate assignment information to the at least one platoon vehicle. Additionally or alternatively, before separating the platoon, the leading vehicle may determine whether the platoon separation is possible based on the toll booth information. If the separation is possible, at least one new platoon according to the platoon separation is formed and passes through a tollgate of the toll booth based on the gate assignment information. When the separation is possible, the leading vehicle may generate platoon separation information. Further, the leading vehicle may transmit the platoon separation information to the at least one platoon vehicle.

When the separation is not possible, the leading vehicle may calculate a time of securing a space for platoon separation. Then, the leading vehicle may generate platoon separation information based on the time of securing the platoon separation. The leading vehicle may transmit the platoon separation information to the at least one platoon vehicle.

Each component of the apparatus or method according to the present disclosure may be implemented as hardware or software, or a combination of hardware and software. A function of each component may be implemented as software, and a microprocessor may be implemented to execute a function of software corresponding to each component.

Various implementations of systems and techniques described herein may be implemented as digital electronic circuitry, integrated circuitry, a field programmable gate array (FPGA), an application specific integrated circuit (ASIC), computer hardware, firmware, software, and/or or a combination thereof. These various implementations may include being implemented as one or more computer programs executable on a programmable system. The programmable system includes at least one coupled programmable processor (which may be a special-purpose processor or a general-purpose processor) coupled to receive data and instructions from a storage system, at least one input device, and at least one output device and to transmit data and instructions thereto. The computer programs (also known as programs, software, software applications or code) contain instructions for a programmable processor and are stored on a "computer readable medium".

A computer-readable recording medium includes all kinds of recording devices in which data to be read by a computer system is stored. These computer-readable recording medium includes a non-volatile or non-transitory medium such as ROM, CD-ROM, a magnetic tape, a floppy disk, a memory card, a hard disk, a magneto-optical disk, and a storage device and may further include a transitory medium such as a data transmission medium. Also, the computer-readable recording medium may be distributed in computer systems connected through a network, and a computer-readable code may be stored and executed in a distributed manner.

In the flowchart/timing diagram of the present specification, it is described that each process is sequentially executed, but this is merely an example of the technical idea of one embodiment of the present disclosure. In other words, those skilled in the art to which an embodiment of the present disclosure belongs may variously change, modify, and apply the flowchart/timing diagram by changing the order described in the flowchart/timing diagram and executing the flowchart/timing diagram within the scope that does not deviate from the essential characteristics of the embodiment of the present disclosure, or performing one or more of the processes in parallel, and thus the flowchart/timing diagram is not limited to a time-series sequence.

The above description is merely an example of the technical idea of the present embodiment, and various modifications and variations may be made to those skilled in the art without departing from the essential characteristics of the present embodiment. Therefore, the present embodiments are not intended to limit the technical idea of the present embodiment, but to explain, and the scope of the technical idea of the present embodiment is not limited by these embodiments. The scope of protection of this embodiment needs to be construed according to the claims below, and all technical ideas within the scope equivalent thereto need to be construed as being included in the scope of rights of this embodiment.

According to the present disclosure, there is an effect of facilitating traffic by allocating a tollgate to each vehicle according to a vehicle type.

According to an embodiment, a toll booth, a leading vehicle, and a platoon vehicle may share information with each other.

According to an embodiment, each vehicle may be assigned a tollgate and form a new platoon.

In addition, according to an embodiment, each vehicle may form a new platoon after passing through a tollgate.

Effects obtainable in the present disclosure are not limited to the effects mentioned above, and other effects not mentioned may be clearly understood by those skilled in the art from the description.

What is claimed is:

1. A method for a leading vehicle for controlling platoon separation in platooning and lane change of a platoon, the method comprising:

performing platooning in a platoon;

receiving platoon vehicle information from the at least one platoon vehicle for the platoon separation, wherein the platoon vehicle information includes vehicle type information;

separating the platoon into a plurality of platoons according to a request or need for platoon separation;

determining whether it is possible to change a lane of the separated platoon to which the leading vehicle belongs;

transmitting lane change information to at least one platoon vehicle within the separated platoon upon determination that lane change is possible; and changing a driving lane for lane change of the separated platoon.

2. The method of claim 1, further comprising:

receiving toll booth information from a toll booth having a plurality of toll gates, wherein the toll booth information includes at least one of tollgate queue information, tollgate information, tollgate operation information, remaining distance information, or information on an estimated time of arrival;

generating gate assignment information based on the platoon vehicle information and the toll booth information; and transmitting the gate assignment information to the at least one platoon vehicle, wherein the at least one platoon vehicle moves to a toll gate assigned in the gate assignment information, determining whether the platoon separation is possible based on whether the change of the lane is possible, wherein the platoon separation is possible if the change of the lane is possible, and the platoon separation is not possible if the change of the lane is not possible, generating platoon separation information based on that the platoon separation is possible;

transmitting the platoon separation information to the at least one platoon vehicle;

wherein at least one new platoon according to the platoon separation is formed and passes through a toll gate of the toll booth based on the gate assignment information.

3. The method of claim 2, further comprising:

determining a time of securing a space for platoon separation based on that the platoon separation is not possible;

generating platoon separation information based on the time of securing the platoon separation; and transmitting the platoon separation information to the at least one platoon vehicle.

4. An apparatus for a leading vehicle for controlling platoon separation in platooning and lane change of a platoon, comprising:

a transceiver configured to transmit and receive information to and from at least one platoon vehicle in the platoon;

a controller configured to control driving related to the platooning, control platoon separation, and control lane change; and a user interface configured to provide a user interface to a driver, wherein the controller is configured to control the leading vehicle to perform platooning in a platoon, receive platoon vehicle information from the at least one platoon vehicle for the platoon separation, wherein the platoon vehicle information includes vehicle type information, separate the platoon into a plurality of platoons according to a request or need for platoon separation, determine whether it is possible to change a lane of the separated platoon to which the leading vehicle belongs, transmit lane change information to at least one platoon vehicle in the separated platoon upon determination that lane change is possible, and change a driving lane for lane change of the separated platoon.

5. The apparatus of claim 4, wherein the transceiver is configured to:

receive toll booth information from a toll booth having a plurality of toll gates, wherein the toll booth information includes at least one of tollgate queue information, tollgate information, tollgate operation information, remaining distance information, or information on an estimated time of arrival, generate the gate assignment information based on the platoon vehicle information and the toll booth information, and transmit gate assignment information to the at least one platoon vehicles, wherein the at least one platoon vehicle moves to a toll gate assigned in the gate assignment information, determine whether the platoon separation is possible based on whether the change of the lane is possible, wherein the platoon separation is possible if the change of the lane is possible, and the platoon separation is not possible if the change of the lane is not possible, generate platoon separation information based on that the platoon separation is possible;

transmit the platoon separation information to the at least one platoon vehicle, wherein at least one new platoon according to the platoon separation is formed and passes through a toll gate of the toll booth based on the gate assignment information.

6. The apparatus of claim 5, wherein the controller is configured to:

determine a time of securing a space for platoon separation based on that the platoon separation is not possible;

generate platoon separation information based on the time of securing the platoon separation; and transmit the platoon separation information to the at least one platoon vehicle.

7. A vehicle for controlling platoon separation in platooning and lane change of a platoon, comprising:

a transceiver configured to transmit and receive information to and from platoon vehicles in the platoon;

a controller configured to control driving related to the platooning, control platoon separation, and control lane change; and a user interface configured to provide a user interface to a driver, wherein the controller is configured to:

perform platooning in a platoon, receive platoon vehicle information from the at least one platoon vehicle for the platoon separation, wherein the platoon vehicle information includes vehicle type information, separate the platoon into a plurality of platoons according to a request or need for platoon separation, determine whether it is possible to change a lane of the separated platoon to which a leading vehicle belongs, transmit lane change information to a vehicle in the separated platoons upon determination that lane change is possible, and change a driving lane for lane change of the separated platoon.

* * * * *